United States Patent
Schnell

(10) Patent No.: US 7,117,578 B2
(45) Date of Patent: Oct. 10, 2006

(54) PROCESS FOR PRODUCING A COMPOSITE COMPONENT

(75) Inventor: Stephan Schnell, Worms (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/450,791

(22) PCT Filed: Dec. 28, 2001

(86) PCT No.: PCT/EP01/15349

§ 371 (c)(1),
(2), (4) Date: Jun. 18, 2003

(87) PCT Pub. No.: WO03/006235

PCT Pub. Date: Jan. 23, 2003

(65) Prior Publication Data

US 2004/0028858 A1 Feb. 12, 2004

(30) Foreign Application Priority Data

May 23, 2001 (DE) ................. 101 25 559

(51) Int. Cl.
*B23P 11/00* (2006.01)

(52) U.S. Cl. .............. 29/505; 29/509; 29/283.5; 428/457

(58) Field of Classification Search .......... 29/469.5, 29/283.5, 520, 515, 513, 509, 505; 72/379.2; 428/457, 458, 57

See application file for complete search history.

(56) References Cited

U.S. PATENT DOCUMENTS

| 1,948,252 | A | * | 2/1934 | Bailey ................. 428/133 |
| 4,911,972 | A | * | 3/1990 | Mercuri ................ 428/99 |
| 5,190,803 | A | | 3/1993 | Goldbach et al. |
| 5,656,353 | A | * | 8/1997 | Butler ................. 428/133 |
| 6,189,958 | B1 | | 2/2001 | Guyomard et al. |
| 6,273,496 | B1 | | 8/2001 | Guyomard et al. |

FOREIGN PATENT DOCUMENTS

| DE | 2426622 A | * | 12/1975 |
| DE | 100 14 332 | | 10/2001 |
| EP | 052 207 | | 5/1982 |
| WO | WO 9925982 A1 | * | 5/1999 |

* cited by examiner

*Primary Examiner*—Marc Jimenez
*Assistant Examiner*—Jermie E. Cozart
(74) *Attorney, Agent, or Firm*—Novak Druce & Quigg, LLP

(57) ABSTRACT

The invention relates to a process for producing a composite component from a plastic structure (1, 25, 31, 37) and a metal body (4, 25, 35, 40) by bringing together joining tools (11, 13). Plastic structure (1, 25, 31, 37) and metal body (4, 25, 35, 40) are joined by penetration, which takes place when contact surfaces (12, 14) of the joining tools (11, 13) are brought together, of tamped edges into the plastic structure (1, 25, 31, 37), in such a manner that a permanent, positive and non-positive connection (34) is formed.

18 Claims, 6 Drawing Sheets

Figure 1:
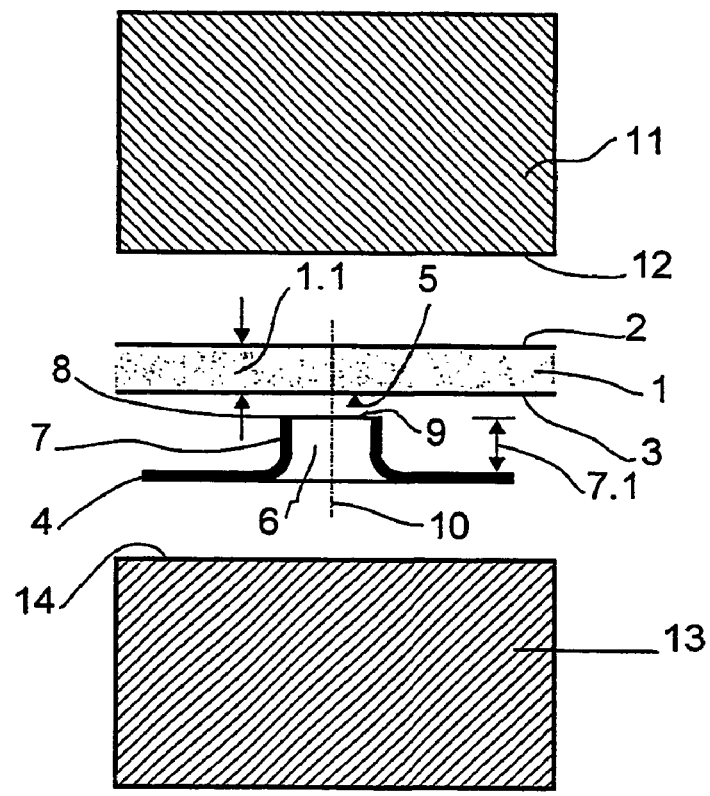

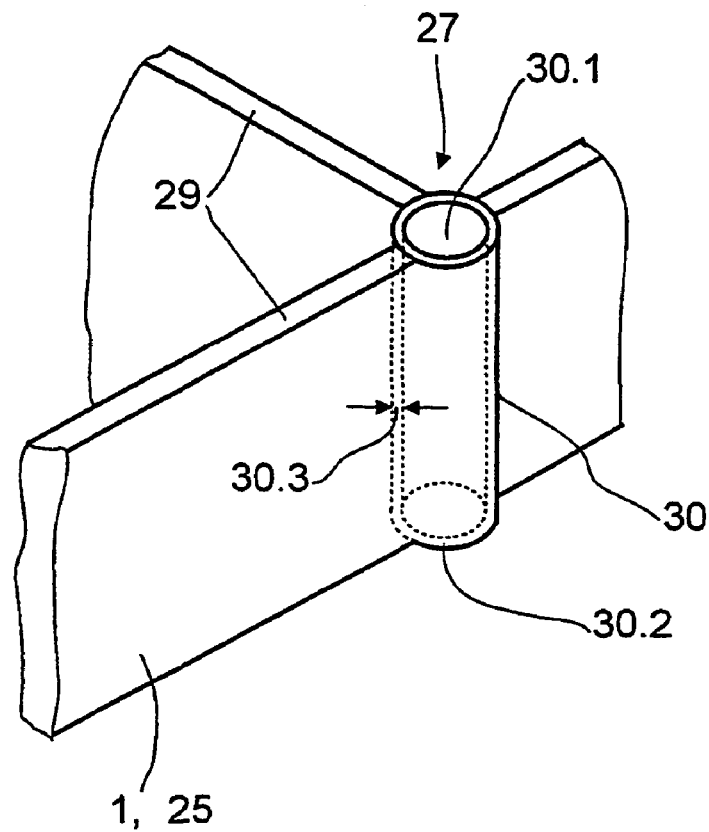
FIG.6
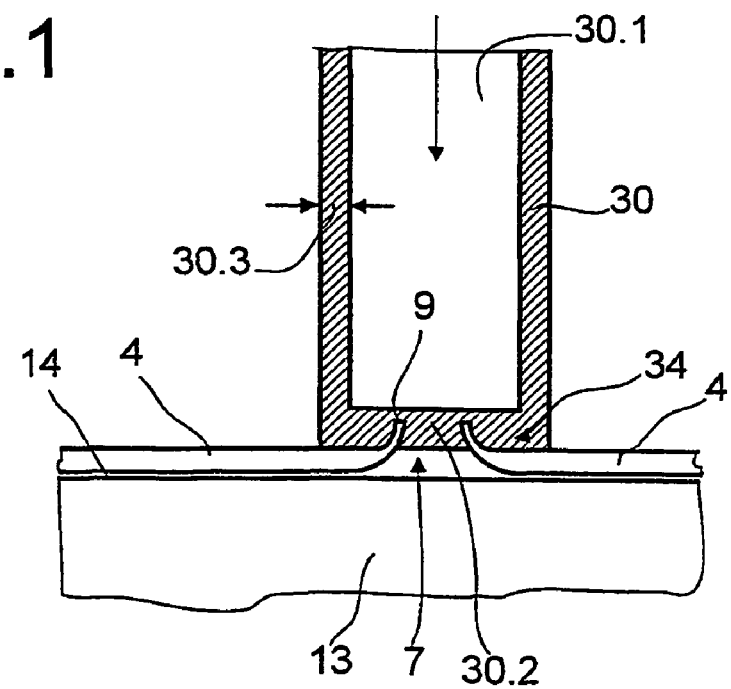
FIG.6.1

FIG.7
FIG.7.1
FIG.8
FIG.8.1
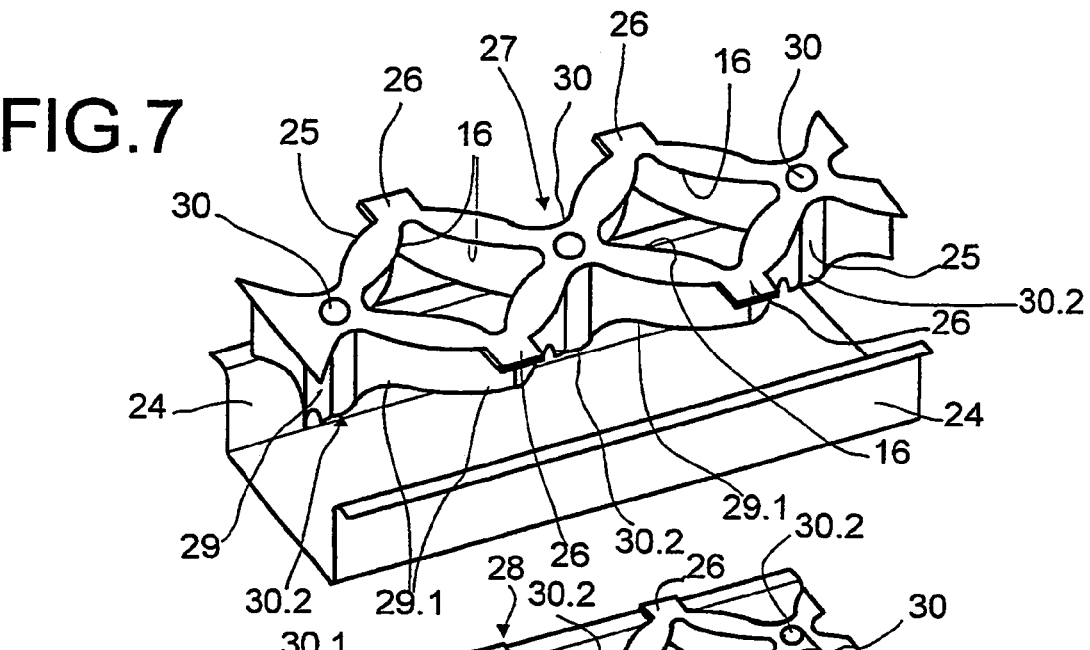
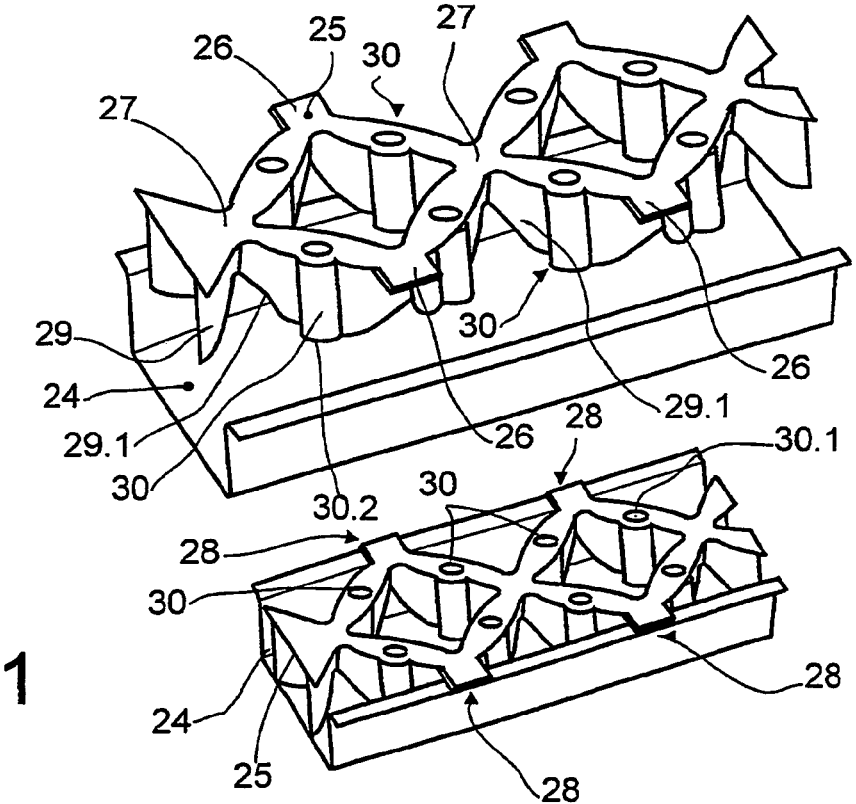

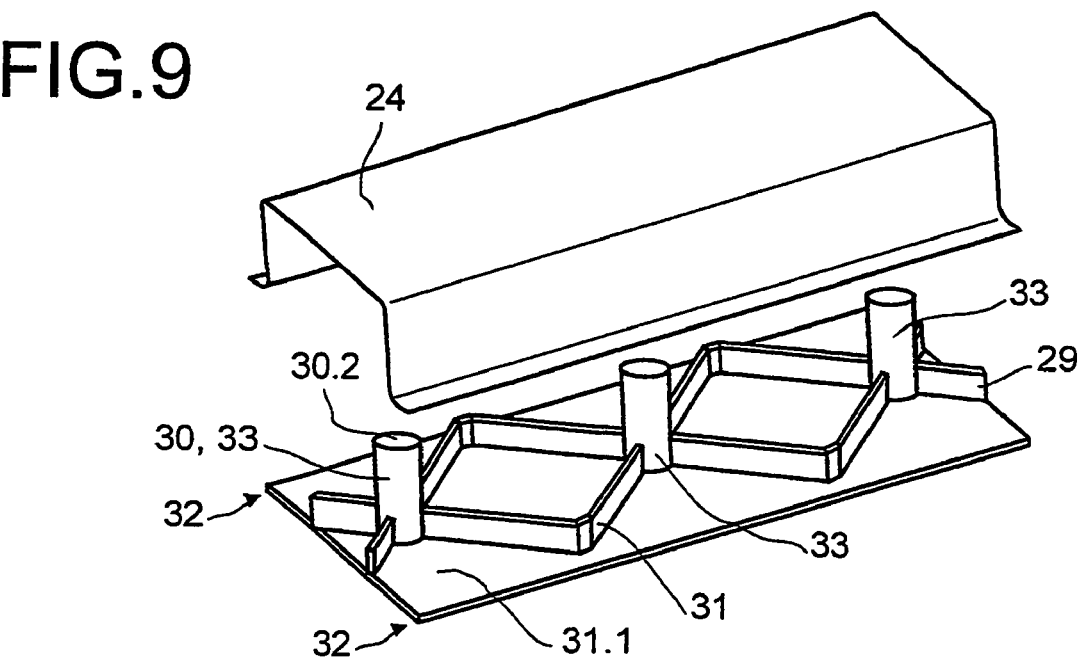
FIG.9
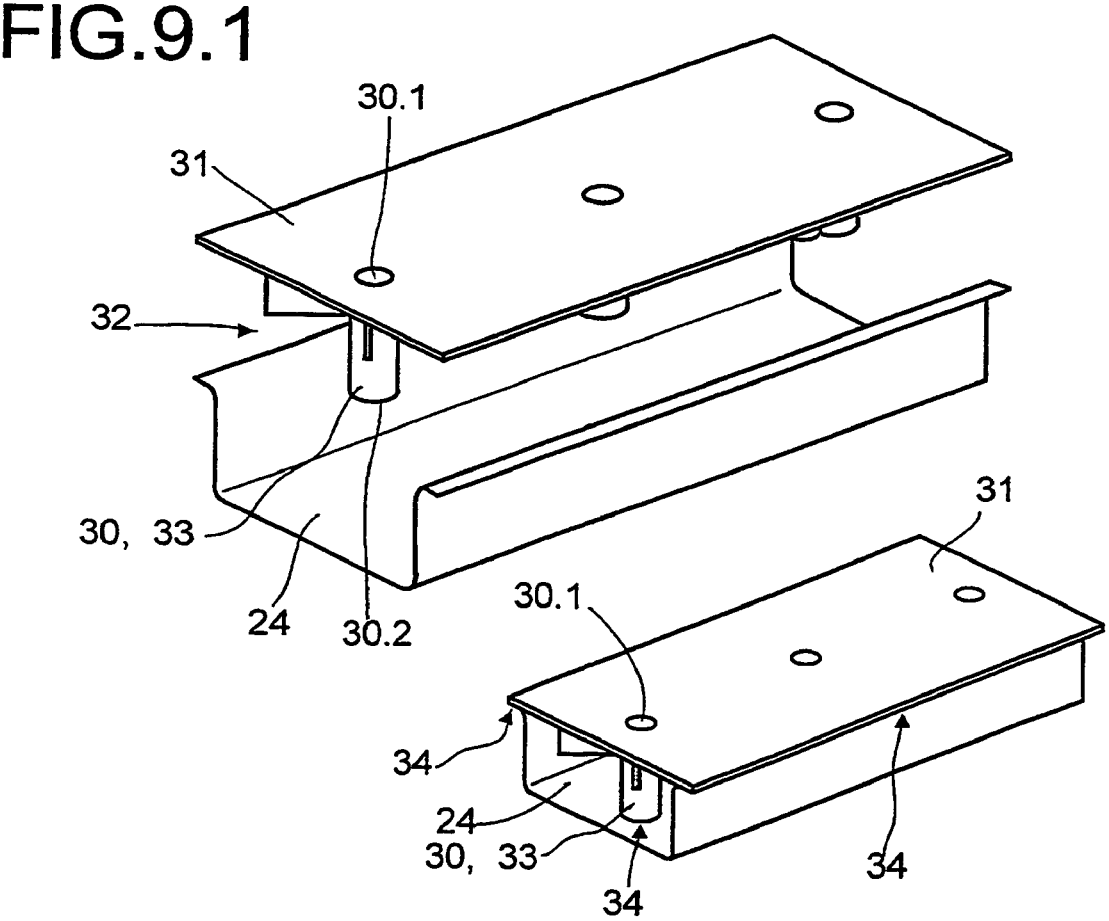
FIG.9.1

FIG.10.1

PROCESS FOR PRODUCING A COMPOSITE COMPONENT

The invention relates to a composite component and to a process for its production, in particular to a positively and non-positively locking plastic/metal connection, which is formed on plastic/metal composite components, and to a joining process.

EP-A 0 370 342 relates to a lightweight construction element. It has a dish-shaped base body, the interior of which has reinforcing ribs which are fixedly connected to the base body. The reinforcing ribs comprise molded-on plastic, and are connected to the base body at discrete connection points via apertures in the base body through which the plastic extends, then spreading over the surfaces of the apertures. This process is very complex and susceptible to wear. It requires a high level of outlay on tool maintenance. A high level of scrap is often inevitable. Moreover, for each new model variant or change, a new, usually complicated injection mold is required, making the process even more expensive. Consequently, series production often entails risks which are impossible to calculate.

The as yet unpublished European patent application reference No. 00119476.0 describes further metal/plastic joining techniques. These are intended to lead to a lower level of product scrap. By way of example, the partial or full-surface adhesive bonding of metal and plastic in the contact regions, the subsequent formation of plastic rivets by means of partial fusion in the apertures of the metal sheet, connection by screws or latching hooks and joining by flanging of tabs on the metal sheet or at the edges or apertures of the plastic structure are disclosed. However, these connecting techniques either require the use of further materials, e.g. adhesives or screws, or of additional process steps.

Finally, a further process for producing a composite component, as described for example in the as yet unpublished German patent application reference No. 100 14 332.6, can be used to produce a component of this type which comprises a hollow profiled section base body. The hollow profiled section base body has the cross section of a hollow profiled section which can be produced using the internal high-pressure forming process. At least one plastic element is fixedly joined to the hollow profiled section base body. The plastic element is injection-molded onto the hollow profiled section base body and is connected to the hollow profiled section base body at discrete connection points, by partially or completely encapsulating the hollow profiled section base body with the plastic which has been molded on for the plastic element at the connection points.

Plastic-metal composite components, which are also known as hybrids or hybrid components, which have been produced using the processes which have been briefly outlined above are used in suitable form in motor vehicles. The hybrid components have a shell-like base body or a hollow profiled section made from metal and a plastic structure which is fixedly connected thereto. The metallic base body imparts the basic rigidity and strength to the composite component. The plastic structure serves firstly to further increase the strength and rigidity and secondly to allow functional integration in the context of forming systems and modules, as well as a reduction in weight. Examples of particularly suitable applications for hybrid components in the automotive industry include the front end supports or front end modules, instrument-panel modules or instrument-panel stays, door functional supports or door modules and similar components for tailgates and rear doors.

In view of the abovementioned solutions forming part of the prior art, the invention is based on the object of providing a hybrid component using an economically available joining process which, while having a comparable weight, has an increased rigidity and strength and is eminently suitable for series production.

According to the invention, this object is achieved by a process for producing a composite component from a metal component and a plastic structure, in which the metal component, which has at least one surface with at least one stamped edge, and the plastic structure are placed into joining tools, and the joining tools are brought together, so that the stamped edge is pressed into the plastic structure in a positively and non-positively locking manner under pressure.

At the joining point, a permanent positively and nonpositively locking connection can be achieved by pressing together plastic structure and metal component.

Conventional presses or stamping and/or deep-drawing machines or similar hydraulically acting joining machines, which are suitable for sheet-metalworking or sheet-metal deformation, can be used for the joining operation, i.e. to press or stamp together metal component and plastic structure. These machines are generally equipped with one or more tools which are matched to the contour of the composite component. To avoid fractures or cracks during joining, it should be ensured that the metal component and the plastic structure lying opposite it bear directly and flat against the tool at the connection point(s) or in the immediate vicinity thereof.

To produce higher numbers, the joining machines can be equipped with one or more tools which are accurately matched to the contours of the parts of the hybrid components, i.e. the composite components, which are to be joined in each case, the joining force optimally being introduced in such a manner that the metallic body bears against the tool on one side of the tool and the oppositely located plastic body bears against the tool at the connecting points or in their immediate vicinity on the other side of the tool. The joining can be effected by bringing together the joining tools either rapidly or slowly. The joining operation enables an elevation, which is designed as a stamped collar, in the metallic base body to twist or dig into the wall of the plastic component, so that a positive and non-positive connection is formed. The joining operation means that the stamped edge or stamped collar may be deformed even during penetration into the plastic body. The form of the protuberance which is deformed by the joining operation may be influenced firstly by the setting angle and height of the undeformed protuberance on the metallic component and secondly by the design of the joining tool.

With the process which is proposed according to the invention, it is possible to join together both conventional plastic structures which are, for example, at ambient temperature and freshly molded parts which drop out of the mold and are still at an elevated temperature and therefore still relatively soft, and also plastic structures which have undergone a subsequent heat treatment, i.e. plastic structures which have only been raised to an elevated temperature just before the joining operation, to a metal component to form a connection which is able to bear high loads.

Compared to corresponding known structures, hybrid components obtained in this way, given the same weight, have advantages in terms of their strength and rigidity.

The metal component, which is also referred to as a metallic body or a metallic base body, has at least one surface which has a stamped edge. This stamped edge can be formed directly during production of the metal component or may be produced subsequently. It is in this case a shoulder, projection or elevation which is able to penetrate into the plastic structure when pressure is applied. Accordingly, the end of the stamped edge is preferably angular in form, i.e. may, for example, be machined into the shape of a rectangle, triangle or trapezium in cross section.

Suitable stamped edges can be obtained by applying them to the metal surface retrospectively by means of known processes, such as soldering or welding. Furthermore, stamped edges of this type may be included in the production of the metal structure. It is preferable to obtain stamped edges by working apertures into the surface of the metal component using stamping or deep-drawing processes. A very wide range of shapes of apertures are possible depending on the choice of stamping tool and are distinguished by the fact that they have a substantially perpendicular stamped edge which delimits the aperture from the metal surface. A substantially perpendicular position of the stamped edge, irrespective of whether it is formed as an aperture or produced separately or integrally, in the context of the present invention is intended to indicate that the stamped edge adopts a setting angle of 60 to 120°, in particular of 70 to 110°, with respect to the metal surface of the metal component. When the metal surface is considered in plan view, the stamped edge may take the form of a straight or wavy or angular line or may be in the shape of a rectangle, square, triangle, oval, circle or any other desired geometric figure. In addition, any other conceivable shape is also possible, provided that it allows metal component and plastic structure to be joined by being pressed together. It is also possible for two or more stamped edges of the same or different shapes to be arranged on a metal surface. Within wide ranges, the thickness of the stamped edge can be selected as desired, provided that the plastic structure is not destroyed during the pressing operation and that a composite component is produced. The thickness of the stamped edge is generally in the range from 0.2 to 2 mm; thicknesses in the range from 0.4 to 1.2 mm are preferred.

The height of the stamped edge, measured from the metal surface, is generally sufficient if it corresponds to the thickness of the plastic structure at the point which is to be connected. However, a permanent connection can also be produced even with lower height, for example with a height in the region of half the thickness of the plastic structure at the point which is to be joined. The metal component, which is also preferred to as a metallic body or metal body, can be made from any desired metal or alloy. Under the joining conditions, it must have a strength which is sufficient to make it possible to produce a permanent, positively locking connection to the plastic structure via the stamped edges.

The wall thickness of the plastic structure is preferably at least 1 mm, preferably 2 to 8 mm. If plastic structures with this wall thickness are joined to metal bodies using the process proposed according to the invention, the stamped-collar-like elevations of the metal body penetrate into the plastic structure, so that a permanent, positively and non-positively locking connection is obtained.

The apertures in the metallic bodies are preferably of circular design. However, they may also be in the form of an oval or a rectangle with rounded corners. At the edge regions, the apertures may advantageously be designed with elevations which are configured in the form of stamped collars and are forced out of the metal sheet and bent upward.

Preferably, the apertures in the metallic bodies are formed as collar-like elevations in their edge regions. Collar-like elevations offer the advantage of having a peripheral edge which can in particular be of angular design, in order to achieve improved entry into the plastic. In the metallic base body, the apertures can be produced, for example, by stamping, deformation of the edge regions of the apertures taking place automatically during the stamping. In addition to being stamped, the deformations in the metallic base body can also be formed by deep-drawing of the metallic bodies.

In the process which is proposed according to the invention, the height of the elevations on the metal body may exceed the wall thickness of the plastic structure. Therefore, it is preferable to have recourse to stamped edges whose heights exceed the thickness of the plastic structure at the connection point by 2 to 40, preferably by 5 to 25 and particularly preferably by 10 to 20%. Since, during the joining operation, pressure is built up and maintained both from the rear side of the metal component and the plastic structure, by means of metal tool walls which are generally resistant to deformation, the projecting stamped edges, after they have penetrated through the plastic structure, are deformed at the opposite press plate, resulting in the formation of an even better positively and non-positively locking connection to the plastic structure.

In addition to the stamped-collar-like elevations on the metal body being formed with a height which exceeds the wall thickness of the plastic structure, the height of the stamped-collar-like elevations may also be less than or equal to the level of the wall thickness of the plastic structure which is to be joined to a metal body. In this case too, pressing the parts together leads to a positive and non-positive connection.

According to a further design variant of the idea on which the invention is based, the deformations may be provided at a setting angle in the plane of the apertures in the metallic body, so that they project virtually perpendicular to the plane of the metallic body. By selecting the setting angle of the projections with respect to the plane of the metallic workpiece in which the apertures and therefore the deformations are produced, it is possible to significantly influence the form of the connection point which is produced during the joining operation. Depending on the setting angle of the deformation on the metal component, the deformation contour of the stamped-collar-like elevation can be widened or narrowed in the center or at the upper region.

In a preferred configuration of the process according to the invention, the diameter range for the apertures produced in the metallic component is in the range from 2 to 50, in particular from 2 to 12 mm.

During the production of the apertures, the peripheral edge of the deformations which delimit the apertures becomes preferably of angular design, in particular of sharp-edged design, in order to allow the peripheral edge to enter the plastic structure when the parts which are to be joined and form a composite component come into contact with one another.

By suitably selecting the setting angle of the elevations, which are configured in the manner of stamped collars, on the metallic body, the contour of the deformation which is established in the region of the joining point between metallic body and plastic element can be influenced. In addition, the deformation contour which is established between metallic component and plastic structure in the region of the joining point between the two parts of the component can be influenced by the configuration of the contact surface of the corresponding upper joining tool which acts on the protuberance, if the stamped edge is higher than the thickness of the plastic structure at the joining point.

In a further embodiment, two or more plastic structures are joined to form a composite component in one operation by being pressed together with a metallic component which has at least one stamped edge, as described above. For this purpose, the plastic structures are located one above the other, without play, at the joining point, so that a non-positive and positive connection is possible. The height of the stamped edge is to be set in such a manner that the end of the stamped edge penetrates through the plastic structures bearing against the metal component or the bearing plastic structures and at least penetrates into the outer plastic structure bearing against the joining tool wall or penetrates all the way through this structure, so that the stamped edge is deformed.

Furthermore, a reinforcing ribbed structure may be molded onto the plastic structure which is connected to a metallic component to form a hybrid component using the process according to the invention.

In a further embodiment, the plastic structure has at least one dome-shaped elevation which is open at the top and the basic surface of which can form a joining surface for interaction with the stamped edge of the metal component.

A joining tool can be introduced into the dome-shaped elevations which are open at the top, which tool, at the base of the open, dome-shaped elevations, applies the compressive force which is required in order to form a permanent, positive and non-positive connection between plastic structure and metal body when the joining surfaces are brought together, so that the stamped-collar-like elevations of the metal body penetrate into the plastic of the base surface of the dome-shaped elevations.

In a preferred embodiment, the plastic structure has two or more dome-shaped elevations which are open at the top and at least two of which are connected to one another by a reinforcing plastic rib, the underside of which may also bear against the metal component. The dome-shaped elevations particularly preferably form intersection points of rib-shaped plastic structures. These plastic structures can readily be produced by means of conventional injection-molding processes. In composite components, particular strengths and rigidities are achieved if every or almost every base plate of a dome-shaped elevation is connected to the metal component via a stamped edge.

Furthermore, the open, dome-shaped elevations can be used or molded on not only at intersection points of a ribbed structure which reinforces the plastic structure, but also at the reinforcing ribs between the intersection points, so that a plurality of joining points are formed, at which the plastic structure and the metal body can be connected to one another in a positive and non-positive manner. In addition to the dome surfaces, the plastic structures may, of course, also be connected to the metal component in a manner in accordance with the invention or in a conventional manner at other joining points.

The plastic ribs of the ribbed structure which reinforces the plastic structure preferably have, on their upper edge, i.e. in the region of the highest loads, a wall which is arranged substantially perpendicular to this ribbed structure and lies flat. This on the one hand reduces the maximum stresses in the loaded plastic and on the other hand prevents the ribbed structure from bulging or bending under load.

Furthermore, the plastic structure may be designed in such a way that, in addition to the plastic ribs at the upper end of the ribs or domes, it has a closed surface in the manner of a cover, which is provided with apertures or passages only at the upper ends of the domes. In this way, in combination with a U-shaped metal body, a quasi-continuous hollow profile is formed. In one embodiment, the edge regions of cover and metal body are also connected to one another in accordance with the invention or in a conventional way, for example by means of subsequent encapsulation by injection molding.

Furthermore, composite components of sandwich structure can be produced by comprising a plastic structure arranged centrally or in the core and two metal sheets which are connected thereto, lie on the outside and are preferably of flat design. The plastic structure, which serves as a spacer, has the above-described domes in order to form the joining points, some of the domes being open at the top and having a base surface at the bottom end side and the remainder of the domes being of precisely the opposite design, i.e. being open at the bottom and provided with a base surface which lies at the top. At the locations of the plastic structure at which the domes are open, the adjacent metal sheets have apertures, so that the joining tool can penetrate into the domes and have access to the joining points. The connections between plastic structure and metal sheet are produced in the base of the domes in a similar manner to the procedure described above.

Figure 2:
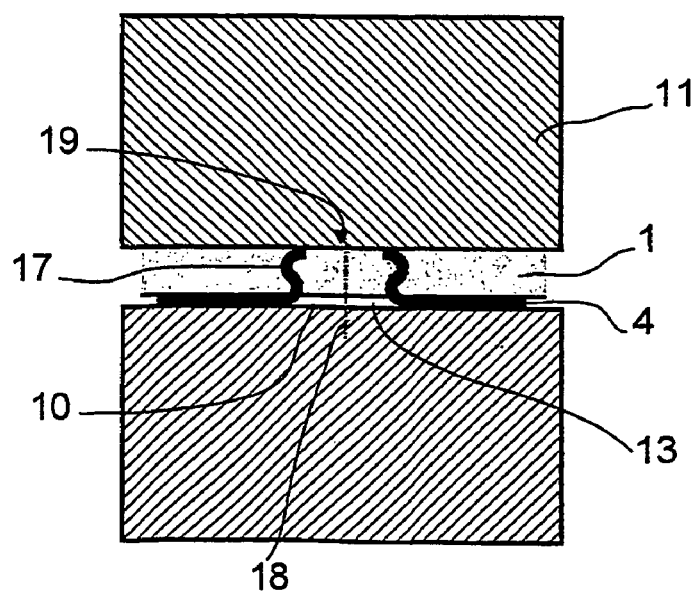
Figure 3:
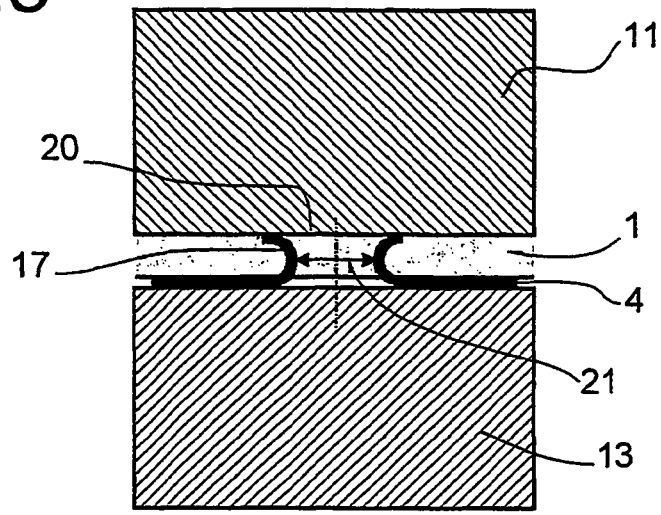
Figure 4:
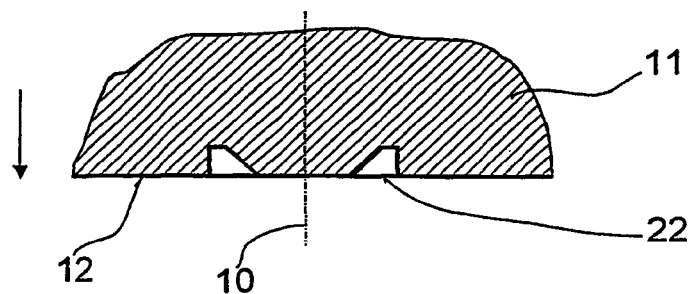
Figure 5:
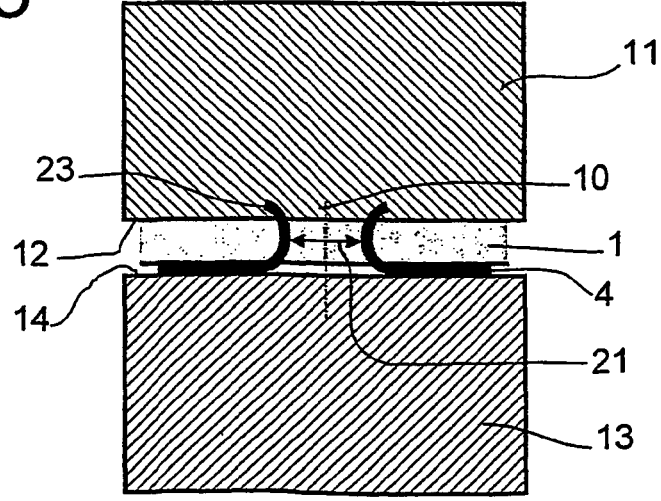
Figure 10:
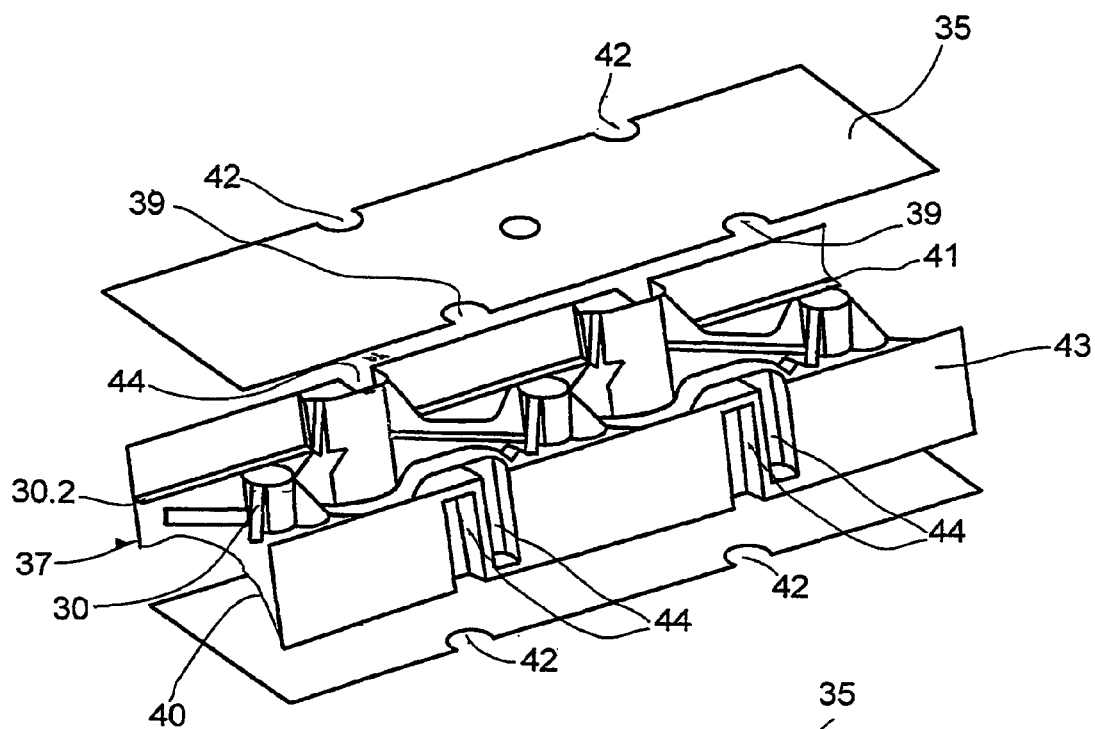
Figure 10:
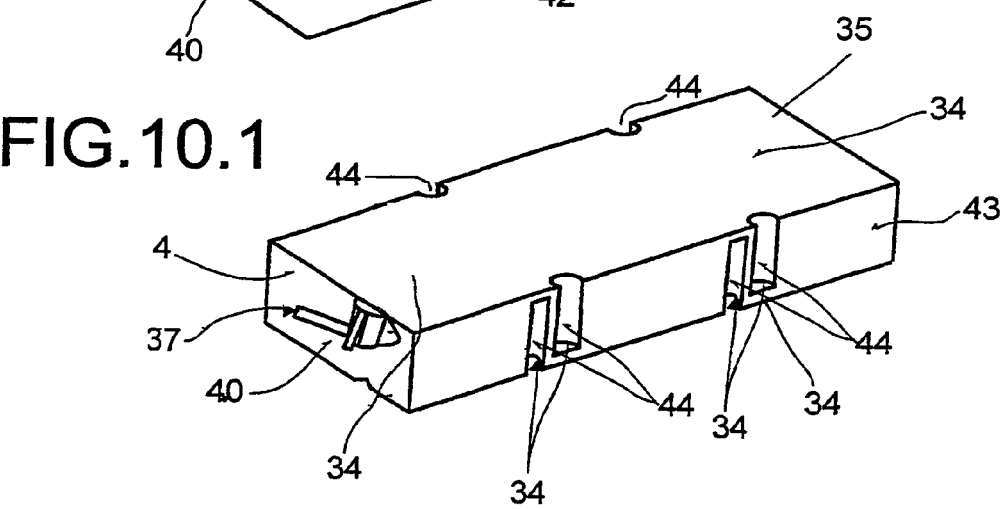

The invention is explained in more detail below with reference to the drawing, in which:

FIG. 1 shows a metal base body and the plastic structure in the region of the connecting point prior to joining, FIG. 2 shows a metal base body and the plastic structure in the region of the connecting point after the joining in a positive and non-positive connection through widening of the elevation, which is configured in the manner of a stamped collar, in its center and narrowing at the upper end, FIG. 3 shows a metal base body and the plastic structure in the region of the connecting point after the joining with positive and non-positive connection by narrowing of the stamped collar in the center and widening thereof at the upper end, FIG. 4 shows part of the upper half of the joining tool with a special encircling annular groove, in an enlarged view, FIG. 5 shows a metal base body and the plastic structure in the region of the connecting point after the joining with positive and non-positive connection by widening of the stamped-collar-like elevation, which projects out of the plastic structure, at its upper end, FIGS. 6 and 6.1 show a dome-like elevation in perspective view and in cross section, FIGS. 7 and 7.1 show a U-shaped metal body with injection-molded, ribbed plastic insert with dome-shaped elevations at the intersection points of the ribbed structure, FIGS. 8 and 8.1 show a U-shaped metal body with injection-molded, ribbed plastic insert and dome-shaped elevations in the center between the intersection points of the ribbed structure, FIGS. 9 and 9.1 show a U-shaped metal body with ribbed, injection-molded plastic insert, which is designed as a cover and, after the joining, together with the metal body forms a closed hollow profiled section, and FIGS. 10 and 10.1 show a composite body of sandwich structure, comprising an upper metal sheet and a lower metal sheet and an injection-molded plastic structure which is provided with side walls and dome-shaped elevations.

The illustration shown in FIG. 1 illustrates a metal base body and the plastic structure in the region of the connection point prior to the joining operation.

The illustration shown in FIG. 1 represents the press tools of a tool which carries out the joining operation in the moved-apart position. The two joining tools which lie opposite one another, namely the upper joining tool 11 and the lower joining tool 13, have contact surfaces 12 and 14, respectively, which face one another. The two parts of the composite component which are to be joined to one another, namely the plastic structure 1 and the metallic component 4, are situated between the moved-apart contact surfaces 12 and 14 of the upper joining tool 11 and the lower joining tool 13, respectively.

In the course of stamping or deep-drawing, the metal body or the metal sheet 4 may be provided with apertures 6 which are, for example, of circular configuration. The apertures 6 of circular configuration are preferably designed in the diameter range of from 2 to 12 mm in the metallic component 4; said processes can be used to produce them. During the stamping or deep-drawing, elevations 7 which run in the form of stamped collars and finish in a sharp peripheral edge 8 at the upper end of the aperture are formed laterally on the apertures 6. The aperture 6 is produced substantially symmetrically with respect to its line of symmetry 10. The peripheral edge 8 which is formed at the upper end 9 of the deformed region 7 configured in the manner of a stamped collar is preferably of angular design, in order to allow the deformation 7 to penetrate at the underside 3 of the plastic structure 1.

To press together sheet-metal base body 4 and plastic structure 1, presses or stamping and/or deep-drawing machines or similar hydraulically acting joining machines which are suitable for sheet-metalworking or sheet-metal deformation can be used. They are generally equipped with one or more tools 11 and 13 which are accurately matched to the contour of the components 1 and 4 which are to be connected to one another. For optimum introduction of the joining force during assembly of said component, it is necessary for both the metallic base body 4, on the one hand, and the plastic structure 1 arranged opposite it, on the other hand, to bear accurately against the corresponding tool contact surface 12 or 14, respectively, at the connecting points, i.e. the joining points, or in their immediate vicinity.

In general, any metal or any metal alloy can be used for the metal component, provided that, in the solid state, it is hard enough to be stamped into the plastic structure. It is customary to use a metal component made from ungalvanized or galvanized steel, aluminum or magnesium. To protect against corrosion or for visual reasons, the metal component may also be covered with a commercially available coating layer. Corrosion-resistant or color coatings of this type and their application are known to the person skilled in the art.

Injection-molded or thermoformed moldings, including films and semifinished products (panels, tubes, sheets, bars, etc.) are suitable for use as plastic structures. The plastic structures are usually composed of thermoplastic, partially crystalline or amorphous polymers, but may also be formed from thermosets or mixtures of these polymer grades.

Suitable thermoplastic polymers are all thermoplastics which are known to the person skilled in the art. Suitable thermoplastic polymers are described, for example, in Kunststoff-Taschenbuch [Plastics Manual], Ed. Saechtling, $25^{th}$ Edition, Hanser-Verlag, Munich, 1992, in particular Chapter 4 and references cited therein, and in Kunststoff-Handbuch [Plastics Handbook], Ed. G. Becker and D. Braun, Volumes 1–11, Hanser-Verlag, 1966–1996.

Examples of suitable thermoplastics which may be mentioned include polyoxyalkylenes, such as polyoxymethylene, e.g. Ultraform® (BASF AG), polycarbonates (PC), polyesters, such as polybutylene terephthalate (PBT), e.g. Ultradur® (BASF AG), or polyethylene terephthalate (PET), polyolefins, such as polyethylene (PE) or polypropylene (PP), poly(meth)acrylates, e.g. PMMA, polyamide, such as polyamide-6 or polyamide-66, (e.g. Ultramid®; BASF AG) vinylaromatic (co)polymers, such as polystyrene, syndiotactic polystyrene, impact-modified polystyrene, such as HIPS, or ASA (e.g. Luran® S; BASF AG), ABS (e.g. Terluran®; BASF AG), SAN (e.g. Luran®; BASF AG), or AES polymers, polyarylene ethers, such as polyphenylene ether (PPE), polyphenylenesulfides, polysulfones, polyethersulfones, polyurethanes, polylactides, halogen-containing polymers, imide-containing polymers, cellulose esters, silicone polymers and thermoplastic elastomers. It is also possible for mixtures of different thermoplastics to be used as materials for the plastic structures. These mixtures may be single-phase or multiphase polymer blends.

Furthermore, the plastic structures may contain customary additives and processing aids.

Examples of suitable additives and processing aids are lubricants or mold-release agents, rubbers, antioxidants, stabilizers to counter the action of light, antistats, flame retardants, fibrous and pulverulent fillers, fibrous and pulverulent reinforcing agents and other additives, or mixtures of these.

Examples of fibrous and/or pulverulent fillers and reinforcing agents are carbon fibers or glass fibers in the form of glass fabrics, glass mats or glass-fiber rovings, shot glass or glass beads. Glass fibers are particularly preferred. The glass fibers used may be made from E, A or C glass and are preferably provided with a size, e.g. based on epoxy resin, silane, aminosilane or polyurethane, and a coupling agent based on functionalized silanes. The glass fibers may be incorporated either in the form of short glass fibers or in the form of continuous strands (rovings).

Suitable particulate fillers are, for example, carbon black, graphite, amorphous silica, whiskers, alumina fibers, magnesium carbonate (chalk), powdered quartz, mica, bentonite, talc, feldspar or in particular calcium silicates, such as wollastonite, and kaolin.

Furthermore, the plastic structures may also contain colors or pigments.

The abovementioned additives, processing aids and/or colors are preferably mixed in an extruder or other mixing device at temperatures of 100 to 320° C., so that the thermoplastic polymer is melted, and discharged. The use of an extruder is particularly preferred, in particular of a corotating, closely intermeshing twin-screw extruder. Processes for producing the plastic molding compounds are well known to the person skilled in the art.

The molding compounds produced in this way can be used to produce all kinds of plastic structures (including semi-finished products), for example using the injection-molding or thermoforming process.

Furthermore, the illustration shown in FIG. 1 shows the wall thickness 1.1 of the plastic structure 1 between upper side 2 and lower side 3 in more detail, as well as the height of the elevations 7, which are designed in the manner of stamped collars, on the metallic base body 4. Preferred values for the wall thickness 1.1 of the plastic body are between 2 and 8 mm. The height of the edges, which have been deformed in the manner of stamped collars, of the apertures 6, which is denoted by 7.1, exceeds the plastic wall thickness 1.1 in the starting state, i.e. in the undeformed state, preferably by approximately 10–30%. The percentage may vary according to the particular embodiment.

FIG. 2 shows a metal base body and the plastic structure in the region of the connection point after the joining in positive and non-positive connection by widening of the stamp-collar-like elevation in its center and narrowing of the stamp-collar-like elevation at the upper end.

The above-described excess height of the edge regions 7 of the aperture 6 in the metallic component 4 means that the peripheral edge 8, which is of angular design, of the limit of the apertures 6 penetrates into the plastic structure 1 at the underside 3 and, toward the end of the phase of penetrating through the plastic wall 1.1, is subjected to the increased resistance from the oppositely arranged contact surface 12 of the upper joining tool, and is consequently deformed. Depending on the setting angle or length of the excess height 7.1 with respect to the wall thickness 1.1, it is possible for a curvature 17 of the edge region 7 of the aperture 6 to be established with a widened section 18 lying in the center and a narrowed section in the upper region 19 can be established. As a result of the deformed contour 17, the stamped-collar-like elevation 7 twists or digs into the plastic wall 1, resulting in a permanent, positive and non-positive connection. The design of the stamped-collar-like elevation 7, which has been deformed by the joining operation, can be influenced firstly by the setting angle of the undeformed protuberance 7 and secondly by the configuration of the upper joining tool 11. Depending on the setting angle of the protuberance or the deformation 7 in its center, they are either widened 18 or narrowed 21 (cf. FIG. 3).

The illustration in FIG. 3 shows a metal base body and the plastic structure in the region of the connection point after the joining with positive and non-positive connection by narrowing of the stamped-collar-like elevation in its center and widening thereof at the upper end.

In this configuration, the stamped-collar-like elevation 7 in the metal base body 4 has experienced a geometry which is opposite to the deformation contour 17 shown in FIG. 2. In this example too, the height 7.1 of the stamped-collar-like elevation 7 which projects beyond the wall thickness 1.1 of the plastic structure 1 means that, after the contact surface 12 of the upper joining tool 11 comes into contact, digging in or complete penetration and therefore a positive connection between plastic structure 1 and metallic body 4 are achieved.

The extent of the widening or narrowing of the stamped-collar-like elevation 7 in accordance with FIGS. 2 and 3 is determined by the size of the difference between the height 7.1 of the stamped-collar-like edges and the wall thickness 1.1 of the plastic wall. Therefore, a further parameter is available for influencing the strength of the connection.

The illustration shown in FIG. 4 shows part of the upper half of the joining tool with a specially configured contact surface 12 in more detail. According to this exemplary embodiment, a recess which is symmetrical with respect to the center axis 10 and is in the form of an annular groove 23 may be formed in the contact surface 12 of the upper joining tool 11. If a composite component is produced by means of an upper joining tool 11 configured as illustrated in FIG. 4, protuberances of the metallic stamped collar 7 which project beyond the upper side 2 of the plastic structure 1, i.e. do not lie inside this structure, and are deformed and pressed flat by the design of the annular groove 23, are established in the region of the upper side 2 of the plastic component 1 which is designed with wall thickness 1.1.

The illustration shown in FIG. 5 represents a joining tool 11 in more detail, the contact surface 12 of which is provided, in a corresponding manner to that illustrated in FIG. 4, with a recess 22 in the form of an annular groove.

When the joining tools 11 and 13, which are arranged opposite one another, are pressed together, the elevation 7, which is configured in the manner of a stamped collar, in the metal body 4 or metal sheet 4 penetrates through the plastic component 1, which is designed with wall thickness 1.1, projecting parts of the stamped-collar-like elevation 7 engaging in the annular groove 22, which is illustrated in FIG. 4, in the contact surface 12 of the upper joining tool 11. It can be seen from the illustration in FIG. 5 that the elevations 7, which are configured in the manner of stamped collars, of the metal sheet or the metal body 4, in the center of the aperture 6, have undergone a central narrowing, while in the upper region the projecting parts 23 of the stamped-collar-like elevation 7 are formed further apart, in accordance with the geometry of the annular groove 22 in the contact surface 12 of the upper joining tool 11. The accuracy of the joining operation shown in FIG. 5 is improved by the fact that both the metal sheet or the metal body 4 is supported without play on the corresponding contact surface 14 of the lower joining tool 16 and with uniform support in the vicinity of the joining point. The same also applies to the arrangement of the plastic component 1, which is arranged above the metal body or metal sheet 4, with respect to the contact surface 12 of the upper joining tool 11.

FIG. 6 shows a dome-shaped elevation of the injection-molded plastic structure in a perspective view and in cross section.

According to the illustration shown in FIG. 6, a dome-shaped elevation 30 is formed at the intersection point 27 of a plastic structure 25 which is provided with a ribbed structure 29. This elevation 30 is provided with an open end 30.1, into which the joining tool moves. At the end which faces the shell-like metal body 24, the dome-like elevation 30 is provided with a base surface 30.2. The wall thickness of the dome-like elevation, at the base 30.2 of which a joining point 34 is produced, is denoted by reference numeral 30.3.

It can be seen from the cross-sectional illustration of the dome-like elevation 30 shown in FIG. 6 that its base surface 30.2 has the end 9 of the stamped-collar-like elevation 7 penetrating through it, so that a joining point 34 is formed at the base surface 30.2 of the dome-shaped elevation 30, at which joining point 34 the metal body 4, which rests on the contact surface 14 of the lower joining tool 13, is positively connected to the plastic structure 1. The mating force which is required for a positive connection is applied by a ram which moves into the opening in the dome-like elevation 30.

The illustration shown in FIG. 6.1 represents a plastic structure 1 which is designed with a wall thickness 1.1. Passing through it is an end 9 of a stamped-collar-like elevation 7 which is formed symmetrically with respect to a center axis 10, on the metal body 4. The height of the stamped-collar-like elevation 7 is less than the wall thickness 1.1 of the plastic structure, so that the collar end 9 does not emerge from the opposite side from the metal body 4.

The illustration shown in FIGS. 7 and 7.1 illustrates a metal body which is configured in the form of a shell and is provided with an injection-molded, reinforcing plastic insert which contains dome-shaped elevations at the intersection points of the ribbed structure.

In accordance with the illustration shown in FIG. 7, the insert plastic body 25, which serves to reinforce the metal structure 24 which is of shell-like configuration, has individual dome-shaped elevations 30, which run in the vertical direction, passing through it. The dome-shaped elevations 30 are substantially in the form of hollow cylinders which at the top have an opening 30.1 for the introduction of a joining tool, i.e. for example, a ram, and at their opposite end, which faces the metallic body 4, are provided with a base surface 30.2. During joining, the base surfaces 30.2 are available for forming the connections 34 (joining points) as shown in FIGS. 1 to 6. The wall thickness 30.3 of the hollow cylinders, which are provided as dome-like elevations 30, preferably lies in the region of the wall thickness of the plastic structure 1 or 24. On its side, the plastic body 25 is provided with bearing tongues 26, and at the intersection points 27 of the injection-molded plastic body 25 reinforcing ribs intersect one another. A ribbed structure 29, which likewise runs in the vertical direction, i.e. parallel to the dome-like elevations 30, of the injection-molded plastic body 25 imparts to this body firstly, in partial regions, a bearing surface against the bottom of the metal body 24, which is of shell-like configuration, and secondly an additional mechanical reinforcement. In the region where the bearing tongues 26 bear against the wall of the shell-like metal body, which is of U-shaped configuration, a joining region 28 is formed, by a joining connection which is formed as shown in FIGS. 1–6 and can be produced by cold-forming processes. Components which have been joined in this way can also be referred to as having been hooked together. If this takes place at a plurality of locations simultaneously (cf. FIG. 7.1), at all the joining regions denoted by reference numerals 28 and 34, the composite component which has been formed and joined in this way inherently has an enormous rigidity and a high level of precision with regard to the dimensions of the two components which are to be fixed together.

In its upper region, each of the plastic ribs of the plastic structure 24 is provided with reinforcing surfaces 16 in the region at which it is highly loaded. The reinforcing surfaces 16 are additionally molded-on walls which are arranged perpendicular to the ribbed structure 29. They firstly prevent the occurrence of unacceptably high maximum stresses in the loaded plastic body and secondly counteract the bulging and bending of the ribbed structure 29. To take into account the principle of lightweight construction, the plastic ribs are withdrawn or hollowed out in the regions 29.1 which face the bottom and the corners of the U-shaped metal sheet. This manner of designing the plastic ribbed structure follows the principle of arranging material where high stresses occur under load and omitting material where the stresses which occur are low.

The illustration shown in FIGS. 8 and 8.1 shows a U-shaped metal body with a ribbed plastic insert, individual dome-shaped elevations, which are preferably designed as hollow cylinders, being provided in the center, between the rib intersection points. Unlike the injection-molded plastic structure 25 illustrated in FIGS. 7 and 7.1, in accordance with the illustrations in FIGS. 8 and 8.1, the dome-shaped elevations 30 are arranged on the injection-molded plastic structure 25 not at the intersection points 27 of the plastic structure 25, but rather along the course of the diagonally running ribs, in each case in the region between two intersection points, whether in the center of the plastic structure 25 or at an intersection point on the wall of the plastic structure 25. According to this design variant of the plastic structure too, the ribbed structures 29 are provided on their upper side with reinforcing surfaces 16 which effectively prevent bulging or bending of the ribbed structure 29 of the plastic structure 25 when load is imposed. The design variant of the plastic structure shown in FIGS. 8 and 8.1 can be used to form a plurality of joining points 34 in plastic structure 25 and metal body 24, which is of dish-like configuration, so that the strength of a hybrid component produced in this way can be increased considerably. In the exemplary embodiment illustrated in FIGS. 7 and 7.1 of an injection-molded reinforcing plastic insert in a metal profiled section which is of dish-like configuration, dome-like elevations 30 can be formed at the intersection points of the ribbed structure 29, centrally with respect to the metal body 24 which is of dish-like configuration.

In the plastic structures 25 shown in FIGS. 8 and 8.1, bearing tongues 26 are once again molded on in the region of the bearing contact. They rest on the side faces, which are of U-shaped profile, of the dish-like metallic body 24 and are joined to this body by cold-forming processes in accordance with the process outlined above.

The illustration in FIGS. 9 and 9.1 shows a U-shaped metal body with ribbed plastic insert, which, expressed in simplified form, is designed as a cover and, after it has been joined to the metal body, forms a closed hollow profiled section. Profiled sections of this type have a high torsional rigidity.

According to this design variant, a shell-like metal body 24 and a plastic sheet structure 31, which is ribbed on the reverse side, are connected to one another. A cross-rib structure 29 is provided on the rear side of the cover surface 31.1, for the purpose of reinforcing the cover surface 31.1. Hollow cylinders which are open at the top, have a base surface 30.2, function as spacers and dome-like elevations and face toward the deep-drawn side of the shell-like metal body 24 are formed in the intersection points of the individual ribs 29. The above-described apertures with the elevations 7 (FIGS. 1–6), which are configured in the manner of stamped collars and are not shown in the illustration given in FIG. 9, are situated in the shell-like metal body 24. When they are pressed together, i.e. when a joining tool is introduced into the hollow-cylindrical spacers or dome-like elevations 30, 33 and the metal body, which is of shell-like configuration, is pressed on, a joining point 34 to the metal body 24, which is of shell-like configuration, as shown in FIGS. 1–6 is formed in the base surface 30.2 of each dome-like elevation or spacer 30 or 33 as illustrated in FIG. 9.

It can be seen from the illustration in FIG. 9 that the ribbed plastic sheet structure 31 is provided on its upper side, in the region of the dome-shaped elevations 30 or spacers 33, with openings 30.1 into which a joining tool moves. The joining tool, which passes through the hollow cylinders of the dome-shaped elevations 30 or spacers 33 until it reaches their base surface 30.2, applies the joining forces which are required to join the shell-like metal body 24 to the ribbed sheet structure 31. Consequently, there is a digging-in effect, i.e. a permanent, positive connection between the ribbed sheet structure 31 in the region of the base surface 30.2 and the bottom of the metallic base body 24 and by means of further joining points 34 along the contact regions 32 between the angled-off limbs of the shell-like base body 24 and those regions of the ribbed sheet structure 31 which cover them.

The assembly drawing 9.1 shows the joined composite component in more detail, comprising a ribbed, sheet-like plastic structure 31 and the shell-like metal profiled section 24 which is profiled in a U shape. The base surface 30.2, which rests on the bottom of the shell-like metal profile, of the hollow-cylindrical, dome-like elevations 30 or spacers 33 forms the joining point 34 which is adjoined by the cylindrical region, i.e. the spacer 33 between ribbed sheet structure 31 and shell-like metal body 24.

The illustration shown in FIGS. 10 and 10.1 shows a design variant of a composite component which corresponds to a sandwich structure. Profiled sections of this type have a high flexural strength.

The parts, illustrated in FIG. 10, of the composite component, which is shown in its joined state in FIG. 10.1, comprise in each case a metallic, large-area body 35 and 40 on the top and bottom sides, respectively. The metallic, large-area bodies 35 and 40 are provided with openings in the region at which they rest on the openings 30.1 of dome-shaped elevations 30 of the plastic structure 37, so that the joining tool is able to move into the hollow-cylindrical, dome-shaped elevations 30 of the plastic structure 37. The metallic large-area bodies 35 and 40, which function as cover and base, respectively, of a composite component, are provided with recesses 42 in the region of the openings 44 in the side walls 43 of the injection-molded component 37. In the top side 35 and the bottom side 40 of the metallic surfaces, the recesses 42 are designed in such a way that in each case access to the mutually opposite recesses 44 in the side walls 43 of the injection-molded plastic component 37 are open at the top side.

It can be seen from the illustration in FIG. 10.1 that the individual recesses 44, which lie next to one another, in the side walls 43 of the injection-molded component 37 are accessible in accordance with FIG. 10 either from the top side or from the bottom side of the composite component in accordance with FIG. 10.1.

In addition to the height of the side walls 43, the distance between the upper metallic surface 35 and the lower metallic surface 40 on the composite component shown in FIG. 10.1 is defined by dome-shaped elevations 30 designed centrally on the injection-molded component 37. When the metal sheets 35, 40 and the plastic structure 37 are being joined together, the above-described connections in accordance with FIGS. 1–6, by means of which the basic rigidity and strength of the composite component are achieved, are formed at the joining points 34.

The metallic base body 4 provides the composite component designed in accordance with the different design variants with the basic strength and rigidity. The plastic structure, which may be provided in accordance with the design variants which form the basis of the above examples, serve firstly to further increase the rigidity and strength and secondly to integrate functions with a view to forming systems or modules.

There are numerous possible applications for the composite components described, for example as components or component parts in the automotive industry, in aircraft construction or in shipbuilding or for the production of domestic or electrical appliances, known as white or brown goods. Examples of applications in the automotive industry include front end modules, front end supports, seat pans, seat structures, instrument panels, functional supports for doors, functional modules for doors, tailgates or side doors. Suitable examples for domestic and electrical appliances include supporting frames for photocopiers, television sets, washing machines or dishwashers, refrigerators and sewing machines.

Compared to the known hybrid components which are produced in a different way, as described in EP 0 370 342 B1, the proposed composite components have the advantage that the plastic structure can in this case be designed substantially without restriction, since according to the present invention the plastic structure can be manufactured in a separate production step. By contrast, the plastic structure in accordance with EP 0 370 342 B1 is injection-molded onto the metallic, shell-like base body, and consequently the degrees of freedom in terms of the demolding of the injection-molded plastic structure are considerably reduced. Consequently, the plastic structure according to the invention can be designed so as to be better able to bear the loads than those from the prior art. In the composite component obtained, this advantage manifests itself by a higher rigidity or strength combined with a similar component weight.

A further advantage is that, since there are no additional processing steps, e.g. adhesive bonding steps, short cycle times can be achieved in series production. Furthermore, there is no need for any additional components or parts for joining plastic structure and metal component. Moreover, the process according to the invention is overall less susceptible to deviations during the positioning of stamped edge and plastic structure. In the process described in EP 0 370 342 B1, a much greater positional accuracy has to be maintained if functioning composite components are to be achieved. Also, the joining process according to the invention does not require any further treatment. Furthermore, any desired plastic structures, irrespective of their production process, can be used; fiber-reinforced plastics are equally suitable. For example, in a shearing test with a composite component having a plastic structure made from glass-fiber-reinforced (30% by weight) polyamide with circular stamped edges with a diameter of 5 mm in the metal component, the fracture forces for each connection point are approximately 1300 N.

LIST OF REFERENCE SYMBOLS

1 Plastic structure
1.1 Wall thickness
2 Top side
3 Lower side
4 Metal body/metal sheet
5 Joining point
6 Aperture
7 Stamp-collar-like elevation
7.1 Height of the protuberance
8 Peripheral edge
9 Collar end
10 Center axis
11 Upper joining tool
12 Contact surface
13 Lower joining tool
14 Contact surface
15 Deformed collar region
16 Reinforcing surface
17 Curvature
18 Central widening
19 Upper narrowing
20 Upper widening
21 Central narrowing
22 Recess in upper joining tool 11
23 Projecting part
24 Shell-like metal body
25 Plastic body
26 Bearing tongues
27 Intersection point
28 Joining region
29 Ribbed structure
29.1 Recess or cutout
30 Dome-like elevation
30.1 Opening
30.2 Base surface
30.3 Wall thickness
31 Ribbed sheet structure
31.1 Cover surface
32 Shell-like metal body bearing
33 Spacer
34 Joining point
35 Metal plate, upper 36 Apertures
37 Plastic structure
38 Grid structure
39 Opening in metal body
40 Metal plate, lower
41 Rib
42 Recess
43 Side wall
44 Oppositely running recess

I claim:

1. A process for producing a composite component from a metal component (4, 24, 35, 40) and a plastic structure (1, 25, 31, 37), which comprises
   providing a metal component (4, 24, 35, 40) which has at least one surface with at least one protuberant stamped edge, and
   providing the plastic structure (1, 25, 31, 37),
   placing the metal component and the plastic structure into joining tools (11, 13) such that the protuberant stamped edge of the metal component faces a surface of the plastic structure, and
   bringing the joining tools together such that the protuberant stamped edge of the metal component penetrates into the plastic structure and is deformed therein in a positively and non-positively locking manner, and
   wherein the stamp edge forms a stamped collar of an aperture passing through the metal surface of the metal component.

2. A process as claimed in claim 1, wherein the stamped edge is arranged substantially vertically on the metal surface.

3. A process as claimed in claim 1, wherein the end of the stamped edge is angular in form.

4. A process as claimed in claim 1, wherein the height of the stamped edge exceeds the thickness of the plastic structure at the point which is to be joined.

5. A process as claimed in claim 1, wherein the height of the stamped edge exceeds the thickness of the plastic structure at the point which is to be joined by up to 40 percent.

6. A process as claimed in claim 1, wherein the height of the stamped edge exceeds the thickness of the plastic structure at the point which is to be joined by up to 35 percent.

7. A process as claimed in claim 1, wherein the metal component (4, 24, 35, 40) and the plastic structure (1, 25, 31, 37) are joined at a joining point (5) having a deformation contour (19, 20, 21, 22) which is influenced by the configuration of the contact surface (12, 22) of the upper joining tool (11).

8. A process as claimed in claim 1, wherein the height (7.1) of the elevation or stamped edge (7) is less than the wall thickness (1.1) of the plastic structure (1, 25, 31, 37) or is equal to the wall thickness (1.1) of the plastic structure.

9. A process as claimed in claim 1, wherein the metal component is in the shape of a shell.

10. A process as claimed in claim 1, wherein the plastic structure (1, 25, 31, 37) comprises at least one dome-shaped elevation (30) which is open at the top and has a base surface (30.2) facing the metal component (4, 24, 35, 40), and wherein the base surface of the dome-shaped elevation forms the surface of the plastic structure which faces the protuberant stamped edges of the metal component.

11. A process as claimed in claim 10, wherein the plastic structure (1, 25, 31, 37) comprises at least two dome-shaped elevations (30) which are connected to one another by a reinforcing ribbed structure (29).

12. A process as claimed in claim 1, wherein the plastic structure (1, 25, 31, 37) comprises a reinforcing, self-intersecting ribbed structure (29), at least one intersection point (27) being designed as a dome-shaped elevation (30) which is open at the top and has a base surface (30.2) which faces the metal body (4, 24, 35, 40).

13. A process as claimed in claim 1, wherein the plastic structure (1, 25, 31, 37) comprises a reinforcing ribbed structure (29) which intersects itself at least once and the ribs of which, between the intersection points (27), have open, dome-shaped elevations (30) with a base surface (30.2) which faces the metal body (4, 24, 35, 40).

14. A process as claimed in claim 1, wherein the ribbed structure (29) of the plastic structure has recesses or cut-outs (29.1) which are adapted to provide a lightweight construction and to prevent losses of rigidity and strength.

15. A process as claimed in claim 11, wherein the plastic structure (1, 25, 31, 37) is provided with reinforcing surfaces (16) which run substantially perpendicular to the ribbed structure (29).

16. A process as claimed in claim 15, wherein the surfaces (16) which run substantially perpendicular to the ribbed structure form a continuous cover surface (31.1).

17. A process for producing a sandwich component, wherein metal components (35, 40), which are provided as top side and underside of the sandwich component and each of which have at least one surface with at least one stamped edge and stamped-out portions (42), are placed into two opposite halves of a joining tool, a plastic structure (1, 25, 31, 37), which comprises dome-shaped elevations (30) which have top and the base surfaces with openings (30.2) which alternately bear against the metal components (35, 40) and the openings of which correspond to the stamped-out portions of the metal components bearing against them, is positioned between the metal components, and the joining tools are brought together, the corresponding stamped edge being pressed in a positively and non-positively locking manner into the plastic structure.

18. A process as claimed in claim 17, wherein spacers (33) are provided on the plastic structure (37).

* * * * *